US005674621A

United States Patent [19]

Visser et al.

[11] Patent Number: 5,674,621

[45] Date of Patent: Oct. 7, 1997

[54] FUSER MEMBERS WITH AN OUTERMOST LAYER OF A FLUORINATED DIAMOND LIKE CARBON

[75] Inventors: Susan Ann Visser, Rochester; Suryadevara V. Babu; Cancheepuram V. Srividya, both of Potsdam, all of N.Y.

[73] Assignee: Eastman Kodak Company, Rochester, N.Y.

[21] Appl. No.: 592,911

[22] Filed: Jan. 29, 1996

[51] Int. Cl.$^6$ .................................................... B32B 9/00

[52] U.S. Cl. ...................... 428/408; 428/411.1; 428/457; 428/688; 492/46

[58] Field of Search ................................ 428/408, 411.1, 428/457, 688; 492/46

[56] References Cited

U.S. PATENT DOCUMENTS

| | | | |
|---|---|---|---|
| 5,089,363 | 2/1992 | Rimai et al. | 430/45 |
| 5,168,023 | 12/1992 | Mitani et al. | 430/58 |

FOREIGN PATENT DOCUMENTS

| | | | |
|---|---|---|---|
| 0 658 827 A2 | 6/1995 | European Pat. Off. | G03G 15/20 |

OTHER PUBLICATIONS

K. Trojan et al, Phys. Stat. Sol. (a), vol. 145, pp. 575–585, 1994.

P.J. Astell–Burt et al, Plasma Chem. Plasma Process, vol. 6, pp. 417–427 1986.

*Primary Examiner*—Mark Chapman
*Attorney, Agent, or Firm*—Doreen M. Wells

[57] ABSTRACT

The present invention provides a fuser member having a substrate and an outermost layer of a fluorinated diamond like carbon wherein the fluorine content of the surface of said layer is between about 20 and 65 atomic percent based on the total amount of fluorine, carbon and oxygen in said surface. The fuser member is characterized in that the outermost layer provides for excellent release of the toner.

15 Claims, No Drawings

FUSER MEMBERS WITH AN OUTERMOST LAYER OF A FLUORINATED DIAMOND LIKE CARBON

FIELD OF THE INVENTION

This invention relates to a fuser member useful for heat-fixing a heat-softenable toner material to a receiver sheet.

BACKGROUND OF THE INVENTION

Heat-softenable toners are widely used in imaging methods such as electrostatography, wherein electrically charged toner is deposited imagewise on a dielectric or photoconductive element beating an electrostatic latent image. Most often in such methods, the toner is then transferred to a surface of another substrate, such as, e.g., a receiver sheet comprising paper or a transparent film, where it is then fixed in place to yield the final desired toner image.

When heat-softenable toners, comprising, e.g., thermoplastic polymeric binders, are employed, the usual method of fixing the toner in place involves applying heat to the toner once it is on the receiver sheet surface to soften it and then allowing or causing the toner to cool.

One such well-known fusing method comprises passing the toner-bearing receiver sheet through the nip formed by a pair of opposing rolls, at least one of which (usually referred to as a fuser roll) is heated and contacts the toner-bearing surface of the receiver sheet in order to heat and soften the toner. The other roll (usually referred to as a pressure roll) serves to press the receiver sheet into contact with the fuser roll.

Other configurations are also known. For example, it is sometimes desirable to employ a fuser belt, as described in Rimai et al U.S. Pat. No. 5,089,363, issued 18 Feb. 1992. Fuser belts are particularly preferred for fusing color images since fusing can take place at one temperature while release from the fusing member can take place at a substantially different temperature. Thus, the fusing process can be optimized for image quality.

Thus, producing photographic-quality glossy images from an electrophotographic copying machine usually requires the use of a belt fusing system. The belt system introduces a number of unique materials requirements. Because heat is applied through a roller on the inside of the belt, the belt must have high thermal conductivity or be extremely thin. It is desirable to avoid use of a thin belt since thin belts have a tendency to wrinkle or tear. Therefore, a metal belt of high thermal conductivity is preferred.

The release of toner from an uncoated metal belt is sometimes less than desired. Instead, thin coatings are typically applied, which coatings aid in releasing the toner from the fusing belt and help to impart the desired surface finish to the toned sheet. Again, because of the thermal conductivity constraints, the coatings must be thin.

Some silicones have been identified that release toner well and impart a desired surface finish, but these materials can be scratched during insertion or removal of the belt from the machine, leading to defects in toned images produced from those belts. Further, achieving adhesion of a silicone material to a metal substrate can sometimes be difficult. Also, application of silicone layers to metal belts may require manufacturing processes that use large quantities of organic solvents, which can be undesirable from an environmental standpoint.

Plasma-polymerized coatings, for example diamond like carbon, are well known for their excellent scratch resistance. Because they are produced by gas-phase reactions, no organic solvents are involved in their manufacture. Diamond like carbon coatings have not been used for fuser members. In EP application 0 658 827 A2 there is disclosed a fusing system that uses a diamond like carbon coating on a heater. However, this heater is not the outermost surface of the fusing belt that comes in contact with the image being fused. Further, we have found that not all diamond like carbon coatings are suitable for the outermost surface of a fusing member.

Plasma-polymerized fluorocarbon coatings are known to produce low surface energy materials. However, they tend to exhibit poor adhesion to their substrates. In order to improve adhesion to the substrate, it has been disclosed (K. Trojan, M. Grischke, and H. Dimigen, *Phys. Stat. Sol.* (a), 145, 575 (1994)) that a gradual increase in fluorine concentration from zero at the substrate surface to the desired composition at the coating surface can be used.

The art teaches away from the use of fluorocarbon coatings on metal substrates. Metallic substrates have been reported to be a problem for plasma-polymerization of certain fluorocarbons. Examining plasma-polymerization of fluorocarbons on stainless steel substrates, Astell-Burt et al. have reported that $C_2F_6$ is "effectively etching in nature" and does not form a polymer film on stainless steel, in contrast to other fluorocarbons examined. (P. J. Astell-Burt, J. A. Cairns, A. K. Cheetham, R. M. Hazel, *Plasma Chem. Plasma Process.* 6, 417 (1986)). Combination of $C_2F_6$ with a hydrocarbon feed gas to achieve a polymer film on stainless steel has not been disclosed.

Thus, there is a continuing need for fuser members, particularly metal fuser belts, which have good toner release and scratch resistance.

SUMMARY OF THE INVENTION

In accordance with the present invention, there is provided a fuser member having a substrate and an outermost layer of a fluorinated diamond like carbon wherein the fluorine content of the surface of said layer is between about 20 and 65 atomic percent based on the total amount of fluorine, carbon and oxygen in said surface.

The fuser members of the invention exhibit excellent toner release. At the same time, the adhesion of the outermost layer to the substrate is also excellent, particularly on metal substrates with an adhesion promoting layer. This is surprising since similar fluorinated diamond like carbon coatings do not provide these properties as is illustrated in the comparative examples.

DETAILED DESCRIPTION

Plasma-polymerized fluorocarbon films can be formed by plasma-enhanced chemical vapor deposition (PE-CVD), also known as glow-discharge decomposition, using an alternating current (AC) or direct current (DC) power source. The AC supply may operate in the radio frequency or the microwave range. Selection of PE-CVD processing parameters, such as power source type or frequency, system pressure, feed gas flow rates, inert diluent gas addition, substrate temperature, and reactor configuration, to optimize product properties is well known in the art.

The fluorocarbon outermost layer used in this invention may be prepared in a number of ways. The outermost layer may be a single layer of uniform composition or a single layer of graduated composition. In the case of a graduated layer composition, the fluorine content should be lowest in the area closest to the substrate and highest in the area furthest from the substrate. Lower fluorine content in the material closest to the substrate improves adhesion to the substrate, while higher fluorine content at the film surface improves release of toner from the fuser member surface. That is, the outermost layer can have a concentration gradient of fluorine which varies from about 0 atomic percent closest to said substrate up to about 20 to 65 atomic percent at the outermost surface. The graduated structure can be made by varying the composition of the feed gas during the deposition of the layer.

The fluorine content on the sample surface, the area furthest from the substrate and the area that comes in contact with the toner, should be at least 20% but not more than 65 atomic percent, preferably at least 30% but not more than 65%, most preferably 50–65%. The fluorocarbon coating on the outer surface can also have at least about 10%, preferably at least 15%, most preferably at least 30%, of the carbon bonded to two or more fluorine atoms ($CF_2$ or $CF_3$) and at least about 2.5% but not more than 70%, preferably at least about 5% but not more than 20%, most preferably at least about 12% but not more than 20%, of the carbon bonded to three fluorine atoms ($CF_3$). Polymers formed using plasma-assisted methods tend to be highly crosslinked films that do not exhibit long range order or a characteristic repeat unit like conventional polymers.

As noted, the atomic percent of fluorine on the surface of the outermost layer should be between about 20 and 65 atomic percent. The atomic percent of the surface of the layer can be determined using X-Ray Photoelectron Spectroscopy (XPS). This is a well known technique that analyses just the surface of a material. For the purposes of the present invention, the term "surface" corresponds to an analysis depth of about 5 nm using XPS. A typical measurement is described in detail in Example 1.

The feed gases selected for preparing the fluorocarbon coating influence the composition and properties of the coating, as is known in the art. See for example, M. J. O'Keefe and J. M. Rigsbee, *Mat. Res. Soc. Syrup. Proc.* 304, 179 (1993) and A. E. Paylath and A. G. Pittman, *ACS Symp. Ser.* 108 (*Plasma Polym.*), 181–192 (1979); R. d'Agostino, P. Favia, and F. Fracassi, *J. Polym. Sci. A* 28, 3387 (1990); and R. d'Agostino, F. Cramarossa, and S. DeBenedictis, *Plasma Chem. and Plasm Process.* 4, 417 (1982).

Feed gases used to prepare the plasma-polymerized fluorocarbon coatings of this invention must include sources of fluorine and carbon. Sources of fluorine include but are not limited m alkane fluorides, alkyl metal fluorides, aryl fluorides, styrene fluorides, alkene fluorides, fluorine substitutes silane and the like. Examples include hexafluoroethane; tetrafluoroethylene; pentafluoroethane; octafluoropropane; 2H-heptafluoropropane; 1H-heptafluoropropane; hexafluoropropylene; 1,1,1,3,3,3-hexafluoropropane; 1,1,1,2,2,3-hexafluoropropane; 1,1,1,2,3,3-hexafluoropropane; 2-(trifluoromethyl)- 1,1,1,3,3,3-hexafluoropropane; 3,3,3-trifluoropropyne; 1,1,1,3,3-pentafluoropropane; 1,1,1,3,3-pentafluoropropene; 1,1,1,2,2-pentafluoropropane; 3,3,3-trifluoropropyne; decafluorobutane; octafluorobutene; hexafluoro-2-butyne; 1,1,1,4,4,4-hexafluorobutane; 1,1,1,4,4,4-hexafluoro-2-butene; perfluoro(t-butyl)acetylene; dodecafluoropentane; decafluoropentene; hexafluoro acetone; 3,3,4,4,4-pentafluorobutene-1; perfluoroheptane; perfluoroheptene; perfluorohexane; 1H,1H,2H-perfluorohexene; perfluoro-2,3,5-trimethyl-hexene-2; perfluoro-2,3,5-trimethylhexene-3; perfluoro-2,4,5-trimethylhexene-2; 3,3,4,4,5,5,5-heptafluoro-1-pentene; decafluoropentene; perfluoro-2-methylpentene; perfluoro-2-methyl-2-pentene, perfluoro-4-methyl-2-pentene, perfluorobenzene, perfluorotoluene, perfluorostyrene, hexafhorosilane, dimethylaluminum fluoride, trimethyltin fluoride, and diethyltin difluoride. The fluorine compounds need not always be in a gaseous phase at room temperature and atmospheric pressure but can be in a liquid or solid phase insofar as they can be vaporized on melting, evaporation, or sublimation, for example, by heating or in a vacuum.

Sources of carbon include the fluorocarbons listed above and also include saturated hydrocarbons, unsaturated hydrocarbons, alicyclic hydrocarbons, and aromatic hydrocarbons. This list includes, but is not limited to, the following: methane, ethane, propane, butane, pentane, hexane, heptane, octane, isobutane, isopentane, neopentane, isohexane, neohexane, dimethylbutane, methylhexane, ethylpentane, dimethylpentane, tributane, methylheptane, dimethylhexane, trimethylpentane, isononane and the like; ethylene, propylene, isobutylene, butene, pentene, methylbutene, heptene, tetramethylethylene, hexene, octene, allene, methyl-allene, butadiene, pentadiene, hexadiene, cyclopentadiene, ocimene, alloocimene, myrcene, hexatriene, acetylene, diacetylene, methylacetylene, butyne, pentyne, hexyne, heptyne, octyne, and the like; cyclopropane, cyclobutane, cyclopentane, cyclohexane, cycloheptane, cyclooctane, cyclopropene, cyclobutene, cyclopentene, cyclohexene, cycloheptene, cyclooctene, limonene, terpinolene, phellandrene, sylvestrene, thujene, carene, pinene, bomylene, camphene, fenchene, cyclofenchene, tricyclene, bisabolene, zingiberene, curcumene, humalene, cadinenesesquibenihene, selinene, caryophyllene, santalene, cedrene, camphorene, phyllocladene, podocarprene, mirene, and the like; benzene, toluene, xylene, hemimellitene, pseudocumene, mesitylene, prehnitene, isodurene, durene, pentamethyl-benzene, hexamethylbenzene, ethylbenzene, propylbenzene, cumene, styrene, biphenyl, terphenyl, diphenylmethane, triphenylmethane, dibenzyl, stilbene, indene, naphthalene, lettalin, anthracene, phenanthrene, and the like. The hydrocarbon compounds also need not always be in a gaseous phase at room temperature and atmospheric pressure but can be in a liquid or solid phase insofar as they can be vaporized on melting, evaporation, or sublimation, for example, by heating or in a vacuum.

Saturated, fully fluorinated fluorocarbons and mixtures thereof are preferred. Unsaturated hydrocarbons are preferred. Hydrogen is usually incorporated into the films in the form of the hydrogen present in the hydrocarbon feed gas. Pure hydrogen may also be used as an additional feed gas. The presence of hydrogen is not required in the materials of this invention but may be included at levels up to 25% without loss of desirable properties. Oxygen may also be incorporated into the films from the feed gas or from atmospheric oxygen gained through reaction with free radicals present on the substrate as it is removed from the reactor. Oxygen should constitute no more than 20%, preferably less than 10%, more preferably less than 1% of the material.

The thickness of the outermost layer of the fuser members of the invention is preferably between about 0.01 and 2.0 micrometers and still more preferably between about 0.1 and 0.5 micrometers. Thinner coatings tend not to form continuous coatings; thicker coatings contain high stress and tend to spontaneously delaminate.

In a preferred embodiment, the fuser member of the invention has an adhesion promoting layer between the substrate and the outermost layer. Where the substrate is metal, the adhesion promoting layer is preferably an amorphous silicon layer. Such an amorphous silicon layer can be made by the same general process as the outermost layer using a silane in the feed gas. The thickness of the adhesion promoting silicon layer is typically between about 50 and 500 angstroms.

In another preferred embodiment, there is a non-fluorinated diamond like carbon between the adhesion promoting silicon layer and the outermost layer. Again, the diamond like carbon interlayer is made by the same process as the outermost layer suing the appropriate components in the feed gas. Useful carbon sources are listed above.

Both in the outermost layer and in the optional interlayer, there is a "diamond like carbon" type structure. This type of structure is well known in the art and is usually characterized by the presence of $sp^3$ bonds as determined by conventional techniques, e.g. high resolution electron energy loss spectroscopy (HREELS). The total thickness of this and the outermost layer falls between about 0.01 and 2.0 micrometers as described above.

Substrates for the coatings of this invention can take many forms that are useful as fusing members. The substrates may be in the form of rollers, belts, or platens, for example. The substrates should preferably be non-compliant in order to prevent failure of the coating or at the coating/substrate interface.

Where the fuser member is a roller, the core of the roller is usually cylindrical in shape. It comprises any rigid metal or plastic substance. Metals are preferred when the fuser member is to be internally heated, because of their generally higher thermal conductivity. Suitable core materials include, e.g., aluminum, steel, various alloys, ceramic materials, alloys of polymers and ceramics and polymeric materials such as thermoset resins, with or without fiber reinforcement.

Belt fuser members can be metals, e.g. stainless steel, nickel, copper, aluminum and the like; plastics such as polyimides, polyamidimides and polyether ether ketones and the like.

The following examples are presented for a further understanding of the invention.

EXAMPLE 1

100% hexafluoroethane reactant gas

A commercial parallel-plate plasma reactor (PlasmaTherm model 730) was used for deposition of all films. The deposition chamber consists of two 0.28 m outer diameter electrodes, a grounded upper electrode and a powered lower electrode. The chamber walls are grounded, and the chamber is 0.38 m in diameter. Removal of heat from the electrodes is accomplished via a fluid jacket. The reactor volume is 0.006 $m^3$, and the active discharge volume is 0.0025 $m^3$. Four outlet ports (0.04 $m^3$), arranged 90° apart on a 0.33 m-diameter circle on the lower wall of the reactor, lead the gases to a blower backed by a mechanical pump. A capacitance manometer monitored the chamber pressure that was controlled by an exhaust valve and controller. A 600-W generator delivers radio-frequency (RF) power at 13.56 MHz through an automatic matching network to the reactor. The gases used in the deposition flowed radially outward from the perforated upper electrode in a showerhead configuration in the chamber. Type 301 stainless steel substrate, 76.2 μm (0.003 inches) thick, was adhered to the lower electrode for cleaning and sample deposition using double-stick tape. The substrate was coated at room temperature.

The stainless steel substrate was cleaned prior to film deposition by etching the surface with argon at a flow rate of 50 std. $cm^3$, a pressure of 3.3 Pa, and an RF power of 150 W for 1 minute. The silicon layer was deposited by exposing the cleaned substrate to a 2% silane gas in argon at a flow rate of 50 std. $cm^3$, a pressure of 3.3 Pa, and an RF power of 150 W for 4 minutes.

On top of the silicon layer, six successive layers were deposited without removing the sample from the reactor between deposition steps. The first layer was a hydrocarbon layer, deposited by introducing acetylene at a flow rate of 3.2 std. $cm^3$ and argon at a flow rate of 12.8 std. $cm^3$ into the reactor at a pressure of 6.5 Pa and an RF power of 100 W for 2 minutes.

The next four layers were deposited at a reactor pressure of 13 Pa, an RF power of 100 W, and with an argon flow rate of 12.8 std. $cm^3$. The second layer was deposited using acetylene at a flow rate of 3.2 std. $cm^3$ and hexafluoroethane at a flow rate of 6.4 std. $cm^3$ for 1 min. The third layer was deposited using acetylene at a flow rate of 3.2 std. $cm^3$ and hexafluoroethane at a flow rate of 12.8 std. $cm^3$ for 1 min. The fourth layer was deposited using acetylene at a flow rate of 3.2 std. $cm^3$ and hexafluoroethane at a flow rate of 19.2 std. $cm^3$ for 1 min. The fifth layer was deposited using acetylene at a flow rate of 3.2 std. $cm^3$ and hexafluoroethane at a flow rate of 28.8 std. $cm^3$ for 3 min.

The sixth and final layer was deposited using a reactor pressure of 13 Pa, an RF power of 100 W, and hexafluoroethane as the only reactant gas at a flow rate of 28.8 std. $cm^3$ for 2 min.

The composition of the surface layer of the sample was analyzed using x-ray photoelectron spectroscopy (XPS). The XPS spectra were obtained on a Physical Electronics 5601 photoelectron spectrometer with monochromatic AlKαx-rays (1486.6 eV). The x-ray source was operated with a 7 mm filament at 200 W. Charge neutralization for these insulating materials was accomplished by flooding the sample surface with low energy electrons (≦25 mA emission current, ≦0.5 eV bias voltage) from an electron gun mounted nearly perpendicular to the sample surface. The pressure in the spectrometer during analysis was typically below $6.5\times10^{-8}$ Pa. For the high resolution spectra, the analyzer operated at a pass energy of 11.75 eV. All spectra were referenced to the C 1s peak for neutral (aliphatic) carbon atoms, which was assigned a value of 284.6 eV. Peak-fitting to determine CF, $CF_2$ and $CF_3$ contents was done using a least-squares deconvolution routine employing line shapes with 90% Gaussian/10% Lorentzian character. Spectra were taken at a 45° electron takeoff angle (ETOA) which corresponds to an analysis depth of ~5 nm. Note that XPS is unable to detect hydrogen. The XPS results are presented in Table 1.

To determine the ability of the coatings to act as a fusing member that can both fuse and release toner in an electrophotographic system, a fusing release test was performed. The test consisted of preparing a toned sheet of paper with a step-gradient increase in toner density from low to high in two colors: cyan and magenta. The step gradient of each color was 1 cm in width, 10 cm in length, and consisted of 10 steps (1 cm×1 cm) of increasing toner density. The toned sheets were prepared using a Ricoh 5006 color copier under standard conditions and with standard Ricoh color toners. Because of the colors selected for the test targets, the resulting copies of each color will be a mixture of different colored toners. The copies were removed from the machine prior to entering the fusing module to give unfused copies for release testing. The test target step gradients were cut from the copier paper containing the unfused step gradients to give targets 4 cm in width and 11 cm in length. A piece of the stainless steel, coated with the material of this Example, 4 cm×11 cm was cut and placed with the coated side against the toned side of the test target. The coated stainless steel/toned paper target package was passed at a speed of 12.7 cm/sec through a pair of rubber fusing rollers set at a nip pressure of 0.55 Pa and a temperature of 160° C. The paper was then removed from the coated stainless steel, and the material was deemed to pass the test if the toned image was fully fused, separated easily from the coating, and left no significant residual toner or paper on the coating. Materials are said to fail the test if there is any significant residual paper or toner left on the coating or if the toned paper could not be removed from the coating. Coating/substrate adhesion failure was said to occur if the coating was removed from the substrate along with the test target in the fusing release test. The results of the fusing release test appear in Table 1.

EXAMPLE 2

90% hexafluoroethane/10 % acetylene reactant gases

Type 301 stainless steel shim stock with a thickness of 76.2 μm (0.003 inches) was used as substrate and was attached to the lower electrode of the plasma reactor with double-sided tape, as described in Example 1. The substrate was cleaned by an argon plasma and had a silicon layer deposited on it as described in Example 1 above. A hydrocarbon layer was deposited atop the silicon layer using acetylene as the reactant gas, introduced at a gas flow rate of 3.2 std. $cm^3$. Inert argon gas was introduced at a flow rate of 12.8 std. $cm^3$, and the reactor pressure and RF power were maintained at 6.5 Pa and 100 W. Deposition duration was 2 min.

Next, the fluorocarbon layer was deposited. Inert argon gas flow was maintained at a flow rate of 12.8 std. $cm^3$, and the reactor pressure and RF power were changed to 13 Pa and 100 W, respectively. Acetylene and hexafluoroethane reactant gases were introduced at gas flow rates of 3.2 std. $cm^3$ and 28.8 std. $cm^3$, respectively. Deposition duration was 8 min. All layers were deposited without removing the substrate from the reactor between steps.

The surface composition of the coating of this Example was determined by XPS, as described in Example 1, and the ability of the coating of this Example to fuse and release toner was evaluated using the fusing release test described in Example 1. The results are presented in Table 1.

EXAMPLE 3

70% hexafluoroethane/30% acetylene reactant gases

Type 301 stainless steel shim stock with a thickness of 76.2 μm was used as substrate and was attached to the lower electrode of the plasma reactor with double-sided tape, as described in Example 1. The substrate was cleaned by an argon plasma and had a silicon layer deposited on it as described in Example 1 above. A hydrocarbon layer was deposited atop the silicon layer using acetylene as the reactant gas, introduced at a gas flow rate of 9.6 std. $cm^3$. Inert argon gas was introduced at a flow rate of 38.4 std. $cm^3$, and the reactor pressure and RF power were maintained at 6.5 Pa and 100 W. Deposition duration was 2 min.

Next, the fluorocarbon layer was deposited. Inert argon gas flow was maintained at a flow rate of 38.4 std. $cm^3$, and the reactor pressure and RF power were changed to 13 Pa and 100 W, respectively. Acetylene and hexafluoroethane reactant gases were introduced at gas flow rates of 9.6 std. $cm^3$ and 22.4 std. $cm^3$, respectively. Deposition duration was 8 min. All layers were deposited without removing the substrate from the reactor between steps.

The surface composition of the coating of this Example was determined by XPS, as described in Example 1, and the ability of the coating of this Example to fuse and release toner was evaluated using the fusing release test described in Example 1. The results are presented in Table 1.

EXAMPLE 4

50% hexafluoroethane/50% acetylene reactant gases

Type 301 stainless steel shim stock with a thickness of 76.2 μm (0.003 inches) was used as substrate and was attached to the lower electrode of the plasma reactor with double-sided tape, as described in Example 1. The substrate was cleaned by an argon plasma and had a silicon layer deposited on it as described in Example 1 above. A hydrocarbon layer was deposited atop the silicon layer using acetylene as the reactant gas, introduced at a gas flow rate of 16 std. $cm^3$. Inert argon gas was introduced at a flow rate of 64 std. $cm^3$, and the reactor pressure and RF power were maintained at 6.5 Pa and 100 W. Deposition duration was 2 min.

Next, the fluorocarbon layer was deposited. Inert argon gas flow was maintained at a flow rate of 64 std. $cm^3$, and the reactor pressure and RF power were changed to 13 Pa and 100 W, respectively. Acetylene and hexafluoroethane reactant gases were introduced at gas flow rates of 16 std. $cm^3$ and 16 std. $cm^3$, respectively. Deposition duration was 4 min. All layers were deposited without removing the substrate from the reactor between steps.

The surface composition of the coating of this Example was determined by XPS, as described in Example 1, and the ability of the coating of this Example to fuse and release toner was evaluated using the fusing release test described in Example 1. The results are presented in Table 1.

EXAMPLE 5

No hydrocarbon interlayer

Type 301 stainless steel shim stock with a thickness of 76.2 μm was used as substrate and was attached to the lower electrode of the plasma reactor with double-sided tape, as described in Example 1. The substrate was cleaned by an argon plasma and had a silicon layer deposited on it as described in Example 1 above. Directly onto the silicon layer, a fluorocarbon layer was deposited using butadiene and hexafluoroethane reactive gases at flow rates of 3.2 std. $cm^3$ and 28.8 std. $cm^3$ respectively. Inert argon gas was introduced at a flow rate of 12.8 std. $cm^3$, and the reactor pressure and RF power were maintained at 13 Pa and 100 W. Deposition duration was 10 min.

Adhesion of the fluorocarbon coating to the substrate was determined by a tape test. A piece of Scotch® (3M Corporation) brand adhesive tape was pressed onto the coating and then pulled rapidly from the coating. No adhesive failure was observed.

Comparative Example 1

25% hexafluoroethane/75% acetylene reactant gases

Type 301 stainless steel shim stock with a thickness of 76.2 μm was used as substrate and was attached to the lower electrode of the plasma reactor with double-sided tape, as described in Example 1. The substrate was cleaned by an argon plasma and had a silicon layer deposited on it as described in Example 1 above. A hydrocarbon layer was deposited atop the silicon layer using acetylene as the reactant gas, introduced at a gas flow rate of 24 std. $cm^3$. Inert argon gas was introduced at a flow rate of 96 std. $cm^3$, and the reactor pressure and RF power were maintained at 6.5 Pa and 100 W. Deposition duration was 2 min.

Next, the fluorocarbon layer was deposited. Inert argon gas flow was maintained at a flow rate of 96 std. $cm^3$, and the reactor pressure and RF power were changed to 13 Pa and 100 W, respectively. Acetylene and hexafluoroethane reactant gases were introduced at gas flow rates of 24 std. $cm^3$ and 8 std. $cm^3$, respectively. Deposition duration was 4 min.

The surface composition of the coating of this Example was determined by XPS, as described in Example 1, and the ability of the coating of this Example to fuse and release toner was evaluated using the fusing release test described in Example 1. The results are presented in Table 1.

Comparative Example 2

0% hexafluoroethane/100% acetylene reactant gases

Type 301 stainless steel shim stock with a thickness of 76.2 μm was used as substrate and was attached to the lower electrode of the plasma reactor with double-sided tape, as described in Example 1. The substrate was cleaned by an argon plasma and had a silicon layer deposited on it as described in Example 1 above. A hydrocarbon layer was deposited atop the silicon layer using acetylacetylene as the reactant gas, introduced at a gas flow rate of 32 std. $cm^3$. Inert argon gas was introduced at a flow rate of 116 std. $cm^3$, and the reactor pressure and RF power were maintained at 13 Pa and 100 W. Deposition duration was 6 min.

The surface composition of the coating of this Example was determined by XPS, as described in Example 1, and the ability of the coating of this Example to fuse and release toner was evaluated using the fusing release test described in Example 1. Because there is no fluorine present in this coating, no data are presented on the CF, $CF_2$, and $CF_3$ content of the coating. The XPS and fusing release test results are presented in Table 1.

EXAMPLE 6

95% hexafluoroethane/5% butadiene reactant gases

Type 301 stainless steel shim stock with a thickness of 76.2 μm was used as substrate and was attached to the lower electrode of the plasma reactor with double-sided tape, as described in Example 1. The substrate was cleaned by an argon plasma and had a silicon layer deposited on it as described in Example 1 above. A hydrocarbon layer was deposited atop the silicon layer using butadiene as the reactant gas, introduced at a gas flow rate of 1.77 std. $cm^3$. Inert argon gas was introduced at a flow rate of 12.8 std. $cm^3$, and the reactor pressure and RF power were maintained at 6.5 Pa and 100 W. Deposition duration was 2 min.

Next, the fluorocarbon layer was deposited. Inert argon gas flow was maintained at a flow rate of 12.8 std. $cm^3$, and the reactor pressure and RF power were changed to 13 Pa and 100 W, respectively. Butadiene and hexafluoroethane reactant gases were introduced at gas flow rates of 1.77 std. $cm^3$ and 28.8 std. $cm^3$ respectively. Deposition duration was 8 min. All layers were deposited without removing the substrate from the reactor between steps.

The surface composition of the coating of this Example was determined by XPS, as described in Example 1, and the ability of the coating of this Example to fuse and release toner was evaluated using the fusing release test described in Example 1. The results are presented in Table 1.

Comparative Example 3

70% hexafluoroethane/30% butadiene reactant gases

Type 301 stainless steel shim stock with a thickness of 76.2 μm was used as substrate and was attached to the lower electrode of the plasma reactor with double-sided tape, as described in Example 1. The substrate was cleaned by an argon plasma and had a silicon layer deposited on it as described in Example 1 above. A hydrocarbon layer was deposited atop the silicon layer using butadiene as the reactant gas, introduced at a gas flow rate of 9.6 std. $cm^3$. Inert argon gas was introduced at a flow rate of 38.4 std. $cm^3$, and the reactor pressure and RF power were maintained at 6.5 Pa and 100 W. Deposition duration was 2 min.

Next, the fluorocarbon layer was deposited. Inert argon gas flow was maintained at a flow rate of 38.4 std. $cm^3$, and the reactor pressure and RF power were changed to 13 Pa and 100 W, respectively. Butadiene and hexafluoroethane reactant gases were introduced at gas flow rates of 9.6 std. $cm^3$ and 22.4 std. $cm^3$, respectively. Deposition duration was 8 min. All layers were deposited without removing the substrate from the reactor between steps.

The surface composition of the coating of this Example was determined by XPS, as described in Example 1, and the ability of the coating of this Example to fuse and release toner was evaluated using the fusing release test described in Example 1. The results are presented in Table 1.

Comparative Example 4

50% hexafluoroethane/50% butadiene reactant gases

Type 301 stainless steel shim stock with a thickness of 76.2 μm was used as substrate and was attached to the lower electrode of the plasma reactor with double-sided tape, as described in Example 1. The substrate was cleaned by an argon plasma and had a silicon layer deposited on it as described in Example 1 above. A hydrocarbon layer was deposited atop the silicon layer using butadiene as the reactant gas, introduced at a gas flow rate of 16 std. $cm^3$. Inert argon gas was introduced at a flow rate of 64 std. $cm^3$, and the reactor pressure and RF power were maintained at 6.5 Pa and 100 W. Deposition duration was 2

Next, the fluorocarbon layer was deposited. Inert argon gas flow was maintained at a flow rate of 6.4 std. $cm^3$, and the reactor pressure and RF power were changed to 13 Pa and 100 W, respectively. Butadiene and hexafluoroethane reactant gases were introduced at gas flow rates of 16 std. $cm^3$ and 16 std. $cm^3$ respectively. Deposition duration was 4 min. All layers were deposited without removing the substrate from the reactor between steps.

The surface composition of the coating of this Example was determined by XPS, as described in Example 1, and the ability of the coating of this Example to fuse and release toner was evaluated using the fusing release test described in Example 1. The results are presented in Table 1.

Comparative Example 5

0% hexafluoroethane/100% butadiene reactant gases

Type 301 stainless steel shim stock with a thickness of 76.2 μm was used as substrate and was attached to the lower electrode of the plasma reactor with double-sided tape, as described in Example 1. The substrate was cleaned by an argon plasma and had a silicon layer deposited on it as described in Example 1 above. A hydrocarbon layer was deposited atop the silicon layer using butadiene as the reactant gas, introduced at a gas flow rate of 23 std. $cm^3$. Inert argon gas was introduced at a flow rate of 92 std. $cm^3$, and the reactor pressure and RF power were maintained at 13 Pa and 150 W. Deposition duration was 2 min.

Next, the another hydrocarbon layer was deposited. Inert argon gas flow was maintained at a flow rate of 92 std. $cm^3$, and the reactor pressure and RF power were changed to 13 Pa and 100 W, respectively. Butadiene reactant gas was introduced at gas flow rate of 23 std. $cm^3$. Deposition duration was 4 min. All layers were deposited without removing the substrate from the reactor between steps.

The surface composition of the coating of this Example was determined by XPS, as described in Example 1, and the ability of the coating of this Example to fuse and release toner was evaluated using the fusing release test described in Example 1. Because there is no fluorine present in this coating, no data are presented on the CF, $CF_2$, and $CF_3$ content of the coating. The XPS and fusing release test results are presented in Table 1.

Comparative Example 6

75 % tetrafluoromethane/25% butadiene reactant gases

Type 301 stainless steel shim stock with a thickness of 76.2 μm was used as substrate and was attached to the lower electrode of the plasma reactor with double-sided tape, as described in Example 1. The substrate was cleaned by an argon plasma and had a silicon layer deposited on it as described in Example 1 above.

Four layers were deposited in succession without removing the sample from the reactor between steps. The system pressure and RF power were maintained at 3.2 Pa and 200 W during all four deposition steps. Inert argon flow rate was maintained at 40 std. $cm^3$ during all four steps as well. The first layer deposited atop the silicon layer was deposited using butadiene reactant gas at a flow rate of 10 std. $cm^3$, deposited for 2 min. The second layer was deposited using butadiene and tetrafluoromethane reactant gases at flow rates of 10 std. $cm^3$ each for a duration of 2 min. The third layer was deposited using butadiene and tetrafluoromethane reactant gases at flow rates of 10 std. $cm^3$ and 20 std. $cm^3$, respectively, for a duration of 2 min. The fourth layer was deposited using butadiene and tetrafluoromethane reactant gases at flow rates of 100 std. $cm^3$ and 40 std. $cm^3$, respectively, for a duration of 4 min.

The surface composition of the coating of this Example was determined by XPS, as described in Example 1, and the ability of the coating of this Example to fuse and release toner was evaluated using the fusing release test described in Example 1. The results are presented in Table 1.

Comparative Example 7

DLC sample

A diamond like carbon (DLC) coating produced by plasma polymerization was coated onto a 76.2 μm thick piece of type 301 stainless steel shim stock. Conventional feed gases and reactor conditions were utilized.

The surface composition of the coating of this Example was determined by XPS, as described in Example 1, and the ability of the coating of this Example to fuse and release toner was evaluated using the fusing release test described in Example 1. It should be noted that, not only did the toned test target stick permanently to the coating material of this Example, but also the coating material was removed from the stainless steel substrate when the test target and the coating were separated. The XPS and fusing release test results are presented in Table 1.

TABLE 1

COMPOSITION AND PERFORMANCE OF EXAMPLES AND COMPARATIVE EXAMPLES

| Example or Comparative Example | XPS composition results: Elemental composition: Carbon (%) | Fluorine (%) | Oxygen (%) | Amount of carbon present as: CF (%) | $CF_3$ (%) | $CF_2$ or $CF_3$ (%) | Fusing release test: Fusing release test result | Substrate/coating adhesion failure |
|---|---|---|---|---|---|---|---|---|
| Ex. 1 | 42 | 56 | 2 | 35.2 | 13.2 | 33.6 | pass | no |
| Ex. 2 | 45 | 52 | 3 | 31.9 | 15.1 | 34.1 | pass | no |
| Ex. 3 | 53 | 41 | 6 | 33.0 | 6.6 | 22.6 | pass | no |
| Ex. 4 | 68 | 24 | 7 | 27.9 | 3.4 | 11.8 | pass | no |
| Comp. Ex. 1 | 82 | 11 | 7 | 19.9 | 0.8 | 3.9 | fail | no |
| Comp. Ex. 2 | 90 | 0 | 10 | — | — | — | fail | no |
| Ex. 6 | 57 | 37 | 6 | 27.7 | 6.4 | 18.4 | pass | no |
| Comp. Ex. 3 | 73 | 19 | 8 | 24.0 | 1.7 | 7.7 | fail | no |
| Comp. Ex. 4 | 79 | 11 | 10 | 23.3 | 1.2 | 4.4 | fail | no |
| Comp. Ex. 5 | 86 | 0 | 14 | — | — | — | fail | no |
| Comp. Ex. 6 | 87 | 5 | 8 | 6 | 0 | 0 | fail | no |
| Comp. Ex. 7 | 90 | 0 | 10 | 0 | 0 | 0 | fail | yes |

The Examples and Comparative Examples demonstrate that the plasma-polymerized fluorocarbon coatings of this invention give good adhesion to the substrate and good electrophotographic fusing and release. Examples 1–4 and 6 demonstrate that plasma-polymerized fluorocarbons containing greater than 20% F with at least 10% of the carbon bonded to two or more F and at least 2.5% of the carbon bonded to three F atoms give good fusing release performance. Example 5 demonstrates that the materials of this invention can be coated without the hydrocarbon interlayer while still maintaining a level of adhesion that may be sufficient for some applications. Comparative Examples 1,3,4, and 6 show that lower fluorine concentrations and/or lower amounts of carbon present as $CF_2$ and/or $CF_3$ do not give acceptable fusing release performance. Comparative Example 3 shows that 19% F with <10% carbon as $CF_2$ or $CF_3$ is not sufficient for good fusing release performance. Comparative Example 7 shows that a silicon interlayer is desirable for good adhesion of a hydrocarbon layer to the substrate where the substrate is stainless steel. Comparative Examples 2, 5, and 7 show that hydrocarbon layers alone will not give good fusing release performance. The results show that plasma-polymerized fluorocarbon films prepared according to this invention give good fusing performance for electrophotographic applications.

The invention has been described with particular reference to preferred embodiments thereof but it will be understood that variations and modifications can be effected within the spirit and scope of the invention.

We claim:

1. A fuser member having a substrate and an outermost layer of a fluorinated diamond like carbon wherein the fluorine content of the surface of said layer is between about 20 and 65 atomic percent based on the total amount of fluorine, carbon and oxygen in said surface.

2. A fuser member according to claim 1 wherein the fluorine content of the surface of said layer is between about 30 and 65 atomic percent. based on the total amount of fluorine, carbon and oxygen in said surface.

3. A fuser member according to claim 1 wherein the fluorine content of the surface of said layer is between about 50 and 65 atomic percent. based on the total amount of fluorine, carbon and oxygen in said surface.

4. A fuser member according to claim 1 wherein said outermost layer has a concentration gradient fluorine which varies from about 0 atomic percent closest to said substrate up to about 20 to 65 atomic percent at the outermost surface.

5. A fuser member according to claim 1 wherein the thickness of said outermost layer is between about 0.01 and 2.0 micrometers.

6. A fuser member according to claim 5 wherein said thickness is between about 0.1 and 0.5 micrometers.

7. A fuser member according to claim 1 wherein said substrate is a metal.

8. A fuser member according to claim 7 wherein said metal is stainless steel.

9. A fuser member according to claim 1 wherein there is an adhesion promoting layer between said substrate and said outermost layer.

10. A fuser member according to claim 9 wherein said adhesion promoting layer comprises amorphous silicon.

11. A fuser member according to claim 9 further comprising a diamond like carbon interlayer between said adhesion promoting layer and said outermost layer.

12. A fuser member according to claim 1 wherein said substrate is a polymeric resin.

13. A fuser member according to claim 1 wherein said member is in the form of a belt.

14. A fuser member according to claim 1 wherein said substrate is a metal having an amorphous silicon adhesion promoting layer.

15. A fuser member according to claim 1 wherein said outermost layer is made by plasma-enhanced chemical vapor deposition.

* * * * *